United States Patent [19]

Boothe

[11] Patent Number: 4,781,419
[45] Date of Patent: Nov. 1, 1988

[54] HUB CAP LOCKING ARRANGEMENT

[76] Inventor: Ralph T. Boothe, 2478 Lazy Brook La., Hacienda Heights, Calif. 91745

[21] Appl. No.: 50,095

[22] Filed: May 14, 1987

[51] Int. Cl.$^4$ .............................. B60B 7/00; B60B 7/06
[52] U.S. Cl. ............................. 301/108 A; 301/37 R; 301/37 P; 301/37 CM; 301/108 S
[58] Field of Search .......... 301/108 A, 108 R, 108 S, 301/37 R, 37 P, 37 S, 37 CM

[56] References Cited

U.S. PATENT DOCUMENTS

| | | | |
|---|---|---|---|
| 4,040,672 | 8/1977 | Imahashi | 301/108 A |
| 4,191,427 | 3/1980 | Bradley | 301/108 S |
| 4,295,685 | 10/1981 | Spisak | 301/108 A |

Primary Examiner—James B. Marbert
Attorney, Agent, or Firm—John G. Mesaros

[57] ABSTRACT

A hub cap locking arrangement, in which, in a first embodiment, a hub cap having a cup-shaped configuration with a generally tubular portion insertable into the wheel hub opening, the tubular portion having a diameter slightly smaller than the diameter of the wheel hub opening of an alloy vehicle wheel. The hub cap may be formed from cast or machined metal or plastic material and is provided with a plurality of radially extending threaded apertures, through which extend pointed threaded members of high strength metal, the threaded members having either a hex head opening or a slotted end. The hub cap is assembled to the wheel from the rear with the wheel removed from the vehicle, the threaded fasteners are then screwed into the apertures from the inner opening of the hub cap until the pointed ends enter into engagement with the inner wall of the wheel hub. In a second embodiment for use with factory provided hub caps, a metal locking ring is provided for insertion within the shallow cup-shaped sheet metal member of the factory hub cap, the locking ring being provided with a plurality of equiangularly disposed spaced threaded apertures through which pass pointed threaded fasteners of high strength metal for partially penetrating and deforming the sheet metal member material into engagement with the interior abutting wall portion of the wheel hub.

18 Claims, 1 Drawing Sheet

HUB CAP LOCKING ARRANGEMENT

BACKGROUND OF THE INVENTION

The background of the invention will be discussed in two parts.

FIELD OF THE INVENTION

This invention relates to hub cap locking arrangements, and more particularly to a locking arrangement for hub caps of alloy wheels.

DESCRIPTION OF THE PRIOR ART

In motor vehicles, particularly motor vehicles having alloy wheels, the hub is a small diameter cylindrical hub of relatively shallow depth. A small cup-shaped hub cap is provided, such hub caps being more in the nature of wheel opening covers, which cover the central hub opening of the wheel through which the front wheel-axle shaft nut is accessible. In the more expensive automobiles, such as the Porsche, the factory provided hub caps are usually formed of a clear or colored plastic disc with the Porsche crest, backed by a shallow cup-shaped sheet metal member having outwardly protruding detents for frictional engagement with the inner surface of the wheel hub opening. Secondary market hub caps are available for such vehicles, oftentimes through the dealers, and such hub caps are generally emblazoned with the factory original Porsche crest. Such secondary market hub caps are usually formed of cast or machined metal which is then chrome plated, with the Porsche crest secured to an outer surface. Other such hub caps may be formed of molded plastic with a crest of some sort suitably molded into the unit or affixed thereto. Even with the plastic type hub caps for alloy wheels, the cost is not necessarily low due to the use of plastic. Such hub caps, both those from the factory and those from the secondary market, are a constant target of thieves, due to the value, or correspondingly high cost, of such hub caps, and the relative ease with which they can be removed by a simple tool such as a screwdriver, or even a pocket knife.

In accordance with an aspect of the invention, it is accordingly an object of the invention to provide a new and improved locking hub cap arrangement.

SUMMARY OF THE INVENTION

The foregoing and other objects of the invention are accomplished by providing, in a first embodiment, a hub cap having a cup-shaped configuration with a generally tubular portion insertable into the wheel hub opening, the tubular portion having a diameter slightly smaller than the diameter of the wheel hub opening of an aluminum or magnesium alloy vehicle wheel. The hub cap may be formed from cast or machined metal or plastic material and is provided with a plurality of radially extending threaded apertures, through which extend pointed threaded members of high strength metal, the threaded members having either a hex head opening or a slotted end. The hub cap is assembled to the wheel from the rear with the wheel removed from the vehicle, the threaded fasteners are then screwed into the apertures from the inner opening of the hub cap until the pointed ends enter into engagement with the inner wall of the wheel hub. In a second embodiment for use with factory provided hub caps, a metal locking ring is provided for insertion within the shallow cup-shaped sheet metal member of the factory hub cap, the locking ring being provided with a plurality of equiangularly disposed spaced threaded apertures through which pass pointed threaded fasteners of high strength metal for partially penetrating and deforming the sheet metal member material into engagement with the interior abutting wall portion of the wheel hub.

Other objects, features and advantages of the invention will become readily apparent from a reading of the specification, when taken in conjunction with the drawings, in which like reference numerals refer to like elements in the several views.

DESCRIPTION OF THE PREFERRED EMBODIMENT

Figure 1:
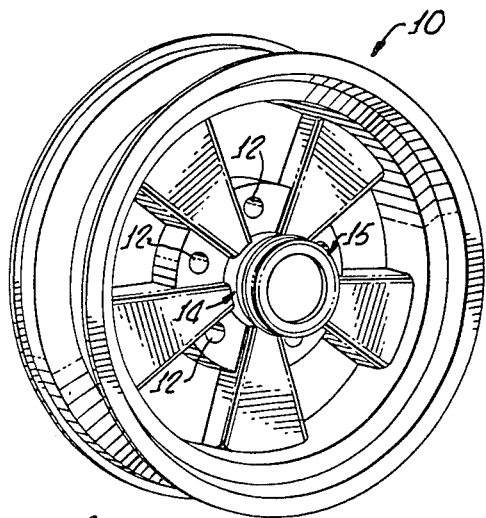
FIG. 1 is a perspective view of an alloy wheel having a hub cap secured within the wheel hub opening in accordance with a first embodiment of the invention.
Figure 2:
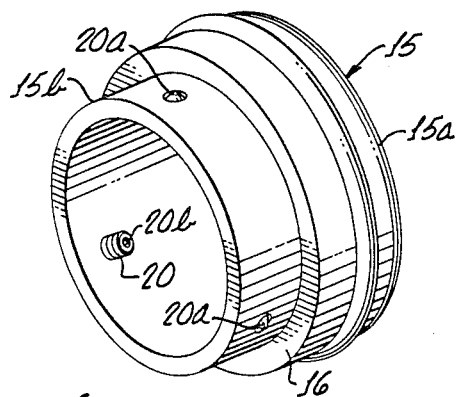
FIG. 2 is a perspective view of the locking hub cap used in the wheel of FIG. 1.
Figure 3:
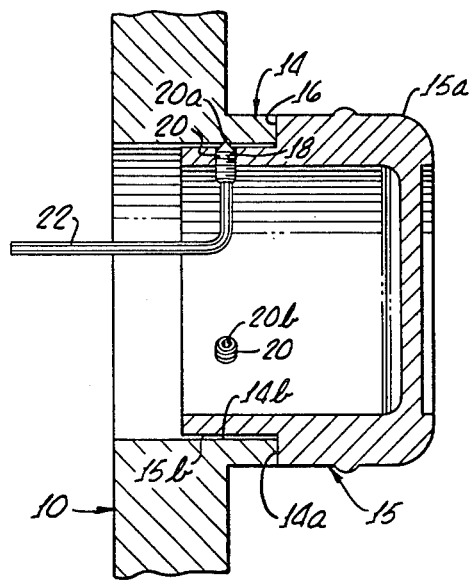
FIG. 3 is an enlarged cross-sectional view of a portion of the wheel and hub of FIG. 1 as viewed along a diameter thereof.

Referring now to the drawings, and particularly to FIGS. 1 through 3, there is shown an alloy wheel, generally designated 10, the wheel 10 being usually formed of cast metal such as aluminum or magnesium alloy. The wheel is configured for retention thereon of a tire (not shown), and for securing to a vehicle such as by lug nuts or lug bolts (not shown) which pass through a plurality of equiangularly spaced lug apertures 12. With such alloy wheels, the lug nuts or lug bolts are generally exposed, and are generally chrome plated or anodized metal.

The central portion of the wheel 10 is provided with a wheel hub portion 14, which includes a circular opening of a constant diameter, which extends through the wheel 10 from front to rear (See FIG. 3). The wheel hub 14 is configured for passage therethrough of the outer end of the wheel axle shaft, on which the axle nut is secured for retaining the brake disc rotor or drum to which the wheel is affixed. A bearing grease retaining cup of sheet metal is affixed to the open end of the brake disc rotor or drum to cover the axle shaft lock nut. This retaining cup protrudes partially into the wheel hub 14 with the wheel assembled on the vehicle.

A secondary or after market hub cap 15 is shown in FIG. 2, the hub cap 15 being cast or machined of metal or plastic as a cup-shaped member having an outer exposed decorative end 15a and an integrally formed tubular portion 15b of generally constant wall thickness. The tubular portion 15b is configured for close fitting insertion into the inner opening 14a of the wheel hub 14, and, as can be seen in FIGS. 2 and 3, the decorative end 15a is of larger diameter or configuration, with a shoulder 16, which abuts against the outer edge 14a of the opening of the wheel hub 14 to thereby act as a stop during insertion. The shoulder 16 and the adjacent edge 14a are planar to provide a close fitting abutting relation to minimize the possiblity of insertion of a prying instrument. Correspondingly, the outer diameter of the hub cap decorative end 15a at the point of abutment with the edge 14a of the wheel hub 14 corresponds in diameter to that of the wheel hub 14.

In accordance with the present invention, the tubular portion 15b is provided with a plurality of equiangularly disposed, radially extending threaded apertures 18, each being configured for receiving therethrough threaded fastener members 20. Each of the apertures 18 is identical and each of the threaded fasteners 20 is identical. In the preferred arrangement, to provide optimum retention capability, three apertures 18 and three fasteners 2θ are provided, spaced 120 degrees apart through the wall of the tubular portion 15b, with the location of the apertures 18 defining a plane parallel to the plane of the open end of the tubular portion 15b. The threaded fasteners 20 have pointed ends 20a and are formed of a high strength metal, such as high grade steel for enabling the pointed ends 20a thereof to perform the required function, that is, a partial penetration of the softer alloy wall of the interior 14b of the wheel hub 14. The other end 20b of the threaded fasteners 20 is suitably configured for receiving a tightening tool, such as with a hex head for receiving a hex wrench 22, as shown in FIG. 2.

With the wheel 10 removed from the vehicle, the hub cap 15 has the tubular portion 15b thereof inserted into the opening of the wheel hub 14 with the hex screws or threaded fasteners 20 having the pointed ends 20a withdrawn below the outer surface of the tubular portion 15b. This insertion continues until the shoulder 16 abuts against the edge 14a of wheel hub 14. The Allen or hex wrench 22 is then inserted from the rear side of the wheel 10 through the opening of the wheel hub 14 into the head 20b of each fastener 20, in turn, the fasteners are then tightened until the pointed ends 20a thereof are in piercing engagement with the inner wall 14b of the wheel hub 14 as shown in FIG. 2. Although such a locking arrangement will work satisfactorily with the hub cap 15 formed of a high strength plastic material, for maximum strength in locking the hub cap 15 within the wheel hub 14, a cast or machined metal or metal alloy hub cap 14 is preferred inasmuch as tightening of the screws or fasteners 20 against the inner wall 14b of metal effects a corresponding force in the opposite direction. With a plastic tubular portion 15b, this counter force would tend to attempt to deform the tubular portion through which the threaded apertures 18 extend. In any event removal of the hub cap 15 can only be effected, without great difficulty, by removal from the rear of the wheel 10, with the wheel 10 removed from the vehicle. One of the essential elements for theft of the hub cap 15 is thereby eliminated, and that is the need to be able to remove the hub cap 15 quickly. The longer a thief is plying his trade, the more likely he is to be noticed.

Figure 5:
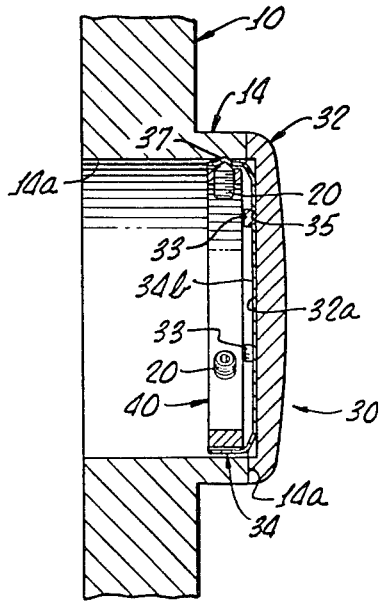
FIG. 5 is a cross-sectional view showing the alternate embodiment of FIG. 4 assembled within a wheel hub opening as viewed along a diameter thereof.
Figure 4:
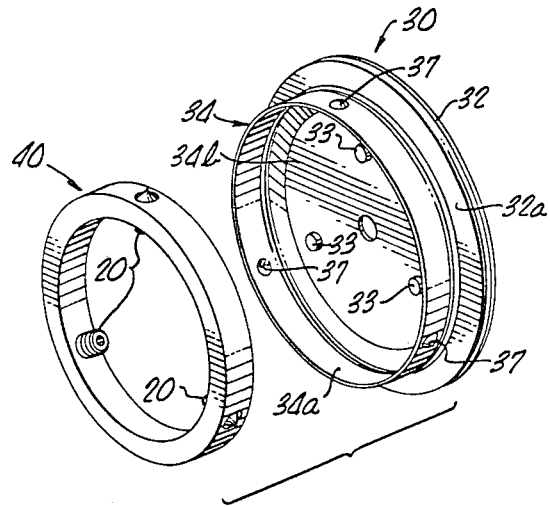
FIG. 4 is an exploded perspective view of a factory provided hub cap with an alternate embodiment of the locking arrangement according to the invention.

The alternate arrangement of FIGS. 4 and 5 provides a locking arrangement for factory original hub caps for alloy wheels. In this embodiment, the hub cap, generally designated 30, is formed form an enlarged disc member 32 having a generally planar rear surface 32a, to which is attached the closed end of a shallow cup-shaped member 34, formed of stamped sheet metal, with a tubularly configured peripheral wall 34a having a diameter generally equal to, or slightly less than, the inner diameter of the opening 14b of the wheel hub 14. The outer or exposed surface of the disc member 32 bears a crest or medallion of the vehicle manufacturer's design. The outer diameter of the disc member 32, as shown in FIG. 5, generally corresponds to the outer diameter of the wheel hub 14 at the point of coaction in abutting relation. Again the mating surfaces are planar to provide very little space for insertion of a prying device. The outer disc member 32 is formed of a pot metal, with projections 33 on the rear surface 32a, which projections 33 protrude through aligned openings 35 in the closed end 34b of the cup-shaped member 34, after which, during assembly, the ends of the projections 33 are suitably swaged for connecting the two parts. To provide some friction upon insertion of the cup-shaped member 34 into the wheel hub 14 opening, the periphery of the wall portion 34a of the cup-shaped member is provided with a plurality of radially outwardly protruding detents or dimples 37. As shown in FIG. 4, there are three dimples 37, equiangularly disposed about the periphery of the wall 34a. During insertion, these dimples 37 provide frictional engagement with the inner wall 14a of the hub 14 opening.

In accordance with the invention, a locking ring 40 is provided, the locking ring 40 being formed of a high strength material such as 6061 aluminum of T-6 hardness, which may be conveniently cut from a cylindrical tube of such material of the proper diameter and wall thickness, and therefore economically fabricated. As in the first embodiment, three equiangularly disposed radially extending apertures are drilled and tapped for receiving three threaded fasteners 20, each with a pointed end 20a. In effect, the positions of the pointed ends 20a of the fastener members 20 correspond in position to the location of the three dimples 37 of the cup-shaped member 34. The outer diameter of the locking ring 40 is generally equal to, or slightly smaller than, the inner diameter of the wall 34a of the cup-shaped member 34 for being received therein as shown in FIG. 5. Correspondingly, the width of the locking ring 40 generally corresponds to the depth of the wall 34a.

For assembly, with the wheel 10 removed from the vehicle, the hub cap 30 is inserted into the wheel hub opening with the outer edge of the rear surface 32a of disc member 32 in close abutting relation with the edge 14a of the wheel hub 14. The locking ring 40 is inserted, from the rear, into the recess within the cup-shaped member 34 with the fasteners 20 of the locking ring 40 aligned with the detents or dimples 37. Thereafter, the fasteners 20 are tightened into penetrating engagement with the dimples 37, thereby applying a much greater force through the dimples 37 into penetrating engagement with the inner wall 14b of the opening of wheel hub 14, thus captively retaining the hub cap 30 on the wheel 10.

In accordance with the invention, there has been shown and described a simple, yet economical, hub cap locking arrangement which may be integrally formed with the hub cap 15 or separately formed, such as by locking ring 40 coacting with the inner periphery of the wall 34a of the cup-shaped factory provided hub cap 32. In either instance, the removal from the wheel 10 of the hub cap 15 or 32, is effectively prevented, thus first requiring removal of the wheel 10 from the vehicle.

While there has been shown and described a preferred embodiment, it is to be understood that various other adaptations and modifications may be made within the spirit and scope of the invention.

What I claim is:

1. A hub cap locking arrangement for use with metal alloy vehicle wheels having a central wheel hub with an opening therethrough having an interior wall, a rear access to the opening, and an edge defining the front of the opening, the combination comprising:

hub cap means having a closed portion including shoulder means for abuttingly engaging said edge with said hub cap means assembled on said wheel;

substantially rigid tubularly configured means in fixed relation to said hub cap means configured for insertion into said opening for generally abutting coaction along the axial length thereof with the interior wall thereof with said shoulder means in abutting engagement with said edge, said tubularly configured means including a plurality of threaded apertures extending therethrough in a radial direction relative to said opening; and threaded fastener means configured for engagement with said threaded aperture means of said tubularly configured means for further coaction with the interior wall of said opening upon tightening of said fastener means for urging ends thereof into tight frictional engagement with said wall for retaining said hub cap means on said wheel, said threaded fastener means being accessible only through the rear access to said opening for enabling tightening or loosening of said fastener means only with said wheel removed from the vehicle.

2. The hub cap locking arrangement of claim 1 wherein said generally tubularly configured means are matingly configured to the shape of said opening.

3. The hub cap locking arrangement of claim 1 wherein said tubularly configured means are an integrally formed portion of said hub cap means.

4. The hub cap locking arrangement of claim 3 wherein said threaded fastener means are threaded fastener members engaging each of said apertures with ends thereof urging against the interior wall of said wheel hub opening.

5. The hub cap locking arrangement of claim 4 wherein said threaded fastener members are formed of metal and are provided with pointed ends for at least partially penetrating engagement into the metal interior wall of said wheel hub opening.

6. The hub cap locking arrangement of claim 1 wherein said closed portion has the outer periphery thereof configured to conform to the shape of the outer periphery of said edge.

7. A hub cap locking arrangement for use with metal alloy vehicle wheels having a central wheel hub with an opening having an interior wall and an edge defining the front of the opening, the combination comprising:

hub cap means having a closed portion including shoulder means for abuttingly engaging said edge with said hub cap means assembled on said wheel;

other means secured to said hub cap means and having a tubular portion configured for insertion into said opening for generally abutting coaction with the interior wall thereof with said shoulder means in abutting engagement with said edge; and threaded fastener means in coacting engagement with said tubular portion and including a plurality of threaded fastener members extending in a radial direction relative to said opening, tightening of said fastener members urging the ends thereof against said tubular portion for deforming the same into tight frictional engagement with said interior wall for retaining said hub cap means on said wheel.

8. The hub cap locking arrangement of claim 7 wherein said tubular portion is formed of a generally thin wall metallic material and said threaded fastener means includes a ring member configured for being received in close abutting relation within said tubularly configured means.

9. The hub cap locking arrangement of claim 8 wherein said threaded fastener means further includes a plurality of radially extending threaded openings in said ring member and said threaded fastener members engage each of said apertures with ends thereof urging against the thin wall metallic material of said tubular portion for urging the same into tight abutting relation with the interior wall of said wheel hub opening.

10. The hub cap locking arrangement of claim 9 wherein said threaded fastener members are provided with pointed ends for at least partially penetrating engagement into the thin wall metallic material of said tubularly configured means.

11. A hub cap locking arrangement for use with metal alloy vehicle wheels having a central wheel hub with an opening and an edge defining the front of the opening, the combination comprising:

hub cap means including a closed end portion having shoulder means for abuttingly engaging said edge with said hub cap means assembled on said wheel;

said hub cap means further including a generally tubular portion matingly configured to the dimensions of said opening for being received therein with said shoulder means coacting with said edge with said hub cap means assembled on said wheel; and threaded fastener means including a plurality of radially extending threaded openings in said tubular portion and threaded fastener members engaging each of said apertures for enabling the ends thereof into frictional coacting engagement with the wall of said wheel hub opening.

12. The hub cap locking arrangement of claim 11 wherein said threaded fastener members are provided with pointed ends facing radially outwardly for at least partially penetrating engagement into the wall of said wheel hub opening.

13. The hub cap locking arrangement of claim 12 wherein said wheel hub opening extends from front to rear of the wheel and the other ends of said threaded fastener members are configured for receiving a tool, said wheel hub opening providing access to said tool from the rear of said opening for enabling tightening or loosening of said fastener members only with said wheel removed form the vehicle.

14. A hub cap locking arrangement for use with metal alloy vehicle wheels having a central wheel hub with an opening having the wall thereof extending through the wheel from front to rear, and an edge defining the front of the opening, with hub cap means including a closed end portion having shoulder means, and having a generally thin wall portion configured for being received within the wheel hub opening in proximate relation with the wall thereof with said shoulder means abuttingly engaging said edge with said hub cap means assembled on said wheel, the improvement comprising:

a ring member dimensioned and configured for being received within said opening in proximate relation with said thin wall portion;

a plurality of threaded apertures radially extending through said ring member; and threaded fastener means in coacting engagement with said apertures, with the ends thereof, upon tightening, coacting with said thin wall portion for urging said thin wall portion into tight frictional engagement with said wall for retaining said hub cap means on said wheel.

15. The hub cap locking arrangement of claim 14 wherein said ring member and said threaded fasteners are formed of metal.

16. The hub cap locking arrangement of claim 15 wherein said threaded fastener members are provided with pointed ends facing radially outwardly for at least partially penetrating engagement into said thin wall portion.

17. The hub cap locking arrangement of claim 14 wherein there are three threaded apertures equiangularly disposed about said ring member and three threaded fastener members.

18. A hub cap locking arrangement for use with metal alloy vehicle wheels having a central wheel hub with an opening having the interior wall thereof extending through the wheel from front to rear, and an edge defining the front of the opening, the combination comprising:

hub cap means including a closed end portion having a shoulder means, and having a generally thin wall portion configured for being received within the wheel hub opening in proximate relation with the wall thereof with said shoulder means abuttingly engaging said edge with said hub cap means assembled on said wheel;

a ring member dimensioned and configured for being received within said opening in proximate relation with said thin wall portion;

a plurality of threaded apertures radially extending through said ring member; and threaded fastener means in coacting engagement with said apertures with end thereof, upon tightening, coacting with said thin wall portion for urging said thin wall portion into tight frictional engagement with said wall for retaining said hub cap means on said wheel.

* * * * *